Dec. 13, 1955     G. B. DAVIS, JR     2,727,129
COFFEE MAKER
Filed Jan. 12, 1953     3 Sheets-Sheet 1
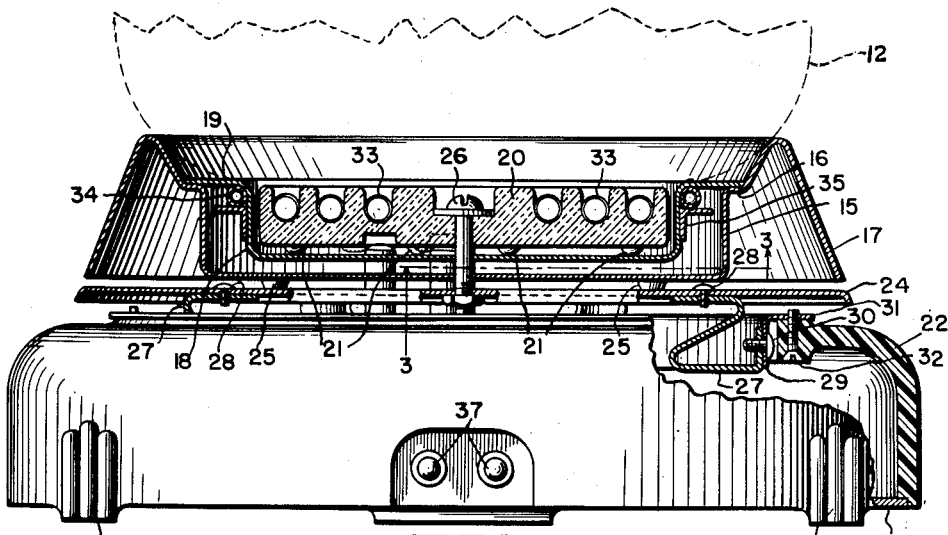
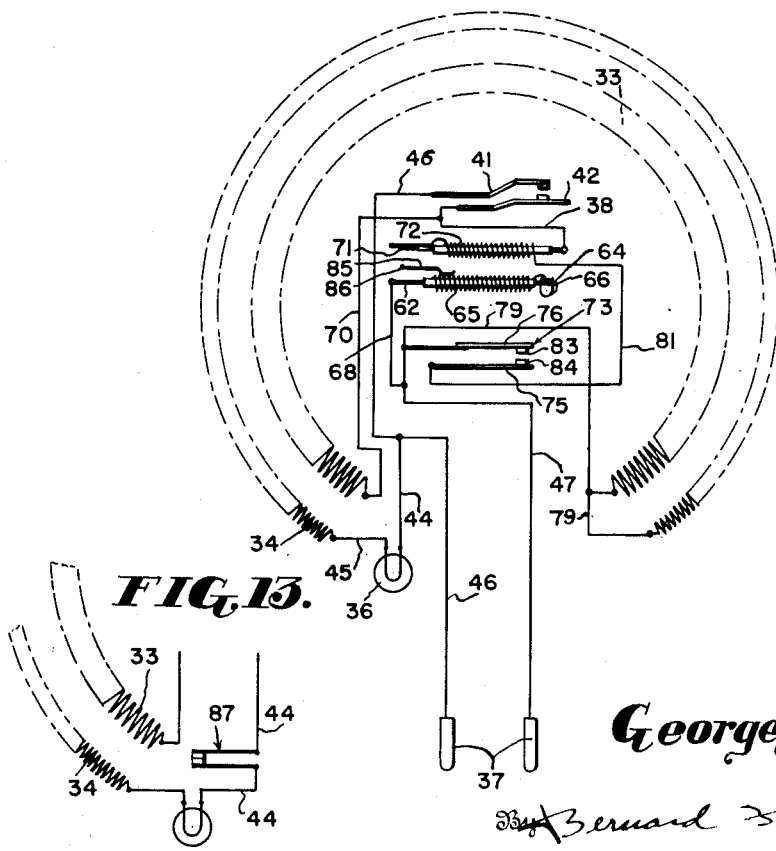

Dec. 13, 1955  G. B. DAVIS, JR  2,727,129
COFFEE MAKER
Filed Jan. 12, 1953  3 Sheets—Sheet 2

Inventor
*George B. Davis, Jr.*
By *Bernard J. Garvey*
Attorney

Dec. 13, 1955  G. B. DAVIS, JR  2,727,129
COFFEE MAKER
Filed Jan. 12, 1953  3 Sheets-Sheet 3

Inventor
George B. Davis, Jr.
By Bernard J. Gawley
Attorney

United States Patent Office 2,727,129
Patented Dec. 13, 1955.

2,727,129

COFFEE MAKER

George B. Davis, Jr., Washington, D. C.

Application January 12, 1953, Serial No. 330,836

5 Claims. (Cl. 219—20)

This invention relates, in general, to coffee makers of the vacuum type, and more particularly to an automatic heater or stove therefor.

The automatic heater or stove of this invention embodies certain new and useful improvements over the structure disclosed in Patent No. 2,385,694, issued to me on September 25, 1945, and over the structures disclosed in Patent Nos. 2,567,187 and 2,567,188, both issued to me on September 11, 1951, and in Patent No. 2,625,642, issued to me January 13, 1953.

In the operation of coffee makers of the vacuum type (having water heating and coffee steeping vessels in liquid communication), water is placed in the lower or water heating vessel, coffee grounds are placed in the upper or coffee steeping vessel and heat is applied to the water in the lower vessel. When sufficiently heated, the water in the lower vessel rises through a tube to the upper vessel where it brews the coffee. Upon removal of heat from the lower bowl, the water vapor therein condenses and the vacuum thereby created is sufficiently great to cause the coffee brew in the upper bowl to pass through a filter into the lower bowl. It is the usual practice to cut off the heat manually upon transfer of the water to the upper bowl permitting the brew to return to the lower bowl. However, various control mechanisms and methods have been employed in an effort to automatically cut off or reduce the heat applied to the water heating bowl after the water has been transferred to the infusion bowl so that the brew is automatically caused to return to the water heating receptacle or bowl, and thus dispense with the former practice of cutting off the heat manually following such transfer of the water.

As a result of experimentation over a considerable period of time, I have found that for the purpose above stated the most effective automatic control is one which is operative in response to the vibrations of the coffee vessel, a functional characteristic of vacuum-type coffee makers. Various types of controls operative responsively to the vibrations of the coffee vessel have been disclosed and claimed by me in my aforementioned patents and pending application for patent. The control mechanism of this invention embodies certain new and useful improvements over those just-mentioned, and comprises a combination and arrangement of elements whereby the control operates effectively to dampen out all extraneous vibrations and to respond only to a continuous series of regular vibrations of the coffee vessel for automatically cutting off or reducing the heat, as and for the purpose stated.

One of the specific objects of the invention is to provide, in a control of the type above generally referred to, an improved switch and actuator therefor.

Another object of the present invention is to provide, in a control of the type above generally referred to, an improved resistor assembly for controlling automatic operation of the above-mentioned switch.

Further it is an object of the invention to provide a combination and arrangement of elements wherein the aforementioned switch and resistor assembly so functionally cooperate with each other and with the other components of the control mechanism that the control will respond only to a continuous series of regular vibrations of the coffee vessel in a manner to positively preclude a cutting off of the heat prematurely, as for example in response to extraneous vibrations such as would result from accidental disturbance of the coffee maker as by heavy or constant walking in the vicinity of the coffee maker; a desideratum closely approached but not fully attained by my aforementioned previous control mechanisms.

The invention, together with its objects and advantages, will be best understood by reading the following detailed description with reference to the accompanying drawings in which is illustrated a presently preferred embodiment of the invention, and wherein:

Fig. 1 is a view, partly in section and partly in elevation, of a stove for vacuum-type coffee makers, embodying the features of the present invention;

Figure 8:
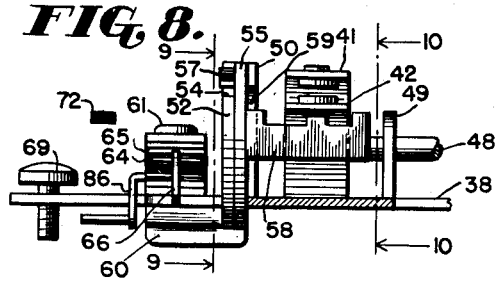
Fig. 8 is a transverse detail sectional elevational view taken substantially on line 8—8 of Fig. 6.
Figure 7:
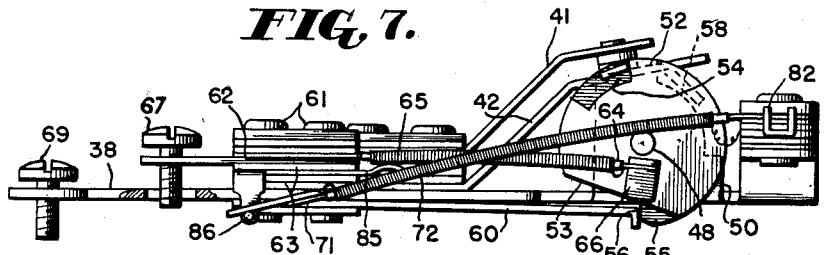
Fig. 7 is a view somewhat similar to Fig. 6 but showing the switch in closed position and the elements of the resistor assembly in position immediately preceding an automatic opening of the switch.
Figure 10:
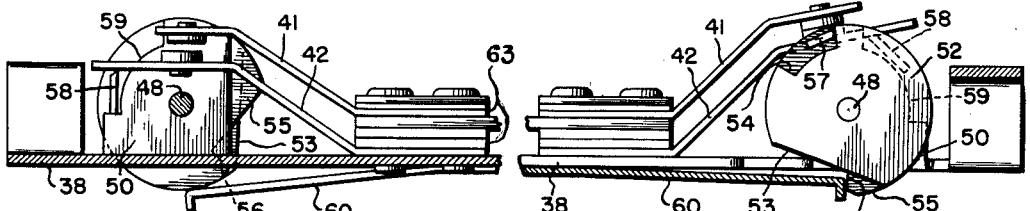
Figures 9, 11:
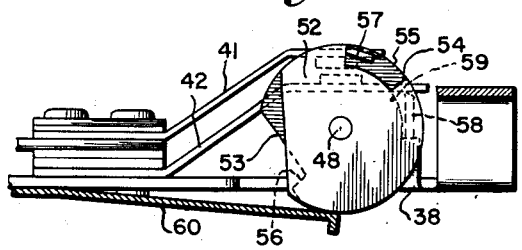

Figs. 9 and 10 are detail sectional views taken substantially on lines 9—9 and 10—10 respectively of Fig. 8;

Fig. 11 is a view somewhat similar to Fig. 10 and showing the parts therein illustrated in substantially the same position as they occupy in Fig. 7;

Fig. 12 is a schematic diagram showing the elements of the heater and control, and the electrical connections therebetween, and Fig. 13 is a fragmentary schematic diagram illustrating the use of a thermal switch which may be included in the control, at the option of the user.

Referring in more detail to the drawing, it will be seen that in general the stove of this invention comprises, as characteristic elements of this invention (1) a resiliently mounted vessel supporting surface in the form of a pan-like member 15 having a peripheral wall formed to provide an internal shoulder 16, and above the shoulder merging into a downwardly directed flared shirt 17, a shallow pan-like casing 18 within the member 15 and provided with a peripheral flange 19 resting on shoulder 16, and a ceramic plate 20 arranged within the casing 18, and supported in elevated position by teats 21 formed on the underside of plate 20; (2) a base 22 formed of a suitable phenol condensation product, such as plastic, and equipped with feet 23, and (3) a heat baffle 24 intermediate the base 22 and member 15 and vertically spaced downwardly relative to member 15 by teats 25 formed on the underside of the bottom wall of member 15.

Member 15, casing 18, ceramic plate 20 and baffle 24 are secured in assembled relation by a center bolt and nut assembly 26 as clearly shown in Fig. 1, and as so assembled are resiliently supported in elevated position on base 22 through the medium of resilient brackets 27 secured to baffle 24, in any suitable manner and as indicated generally at 28, and to an annulus 29 as indicated generally at 30, and which annulus is in turn secured to the base 22 by an attaching flange 31, with which annulus 29 is equipped, and fastening elements 32, all as clearly shown in Fig. 1.

Associated with the resiliently mounted vessel supporting surface (element (1) above described in detail) are a main electric heating element 33 and an auxiliary electric heating element 34. Heating element 33 is arranged within channels provided in the ceramic plate 20, and sheathed heating element 34 is disposed circumjacent the casing 18 and is confined between the flange 19 of that casing and a supporting annulus 35 suitably mounted on the peripheral wall of casing 18 and secured thereto in any suitable manner, as by being welded thereto.

The construction, combination and arrangement of elements as set forth in the preceding paragraph constitute a very salient feature of this invention. By such an arrangement it will be apparent that heat from the auxiliary electric heating element 34 is comunicated to the lower or water heating vessel 12 by way of the heat transfer flange 19 of the casing 18 for applying a warming heat to the mentioned water heating vessel. It will, therefore, be seen that in accordance with this invention not only is the auxiliary heating element 34 highly effective in applying the desired warming heat to the water heating vessel 12, but the auxiliary heating element is effectively protected from the deteriorating effects of direct heat generated by the main and larger heating element 33. As a consequence, not only is the effective life of the auxiliary heating element 34 materially increased, but removal and/or replacement of either the main heating element 33 and the auxiliary heating element 34 may be effected without disturbing the other.

Base 22 is provided with a chamber that houses an electric signal lamp 36, and is of course provided with a suitable sight window; the function of indicating lamp 36 being, as will hereinafter be more fully disclosed, to show when the auxiliary heating element 34 is in operation.

Figure 2:
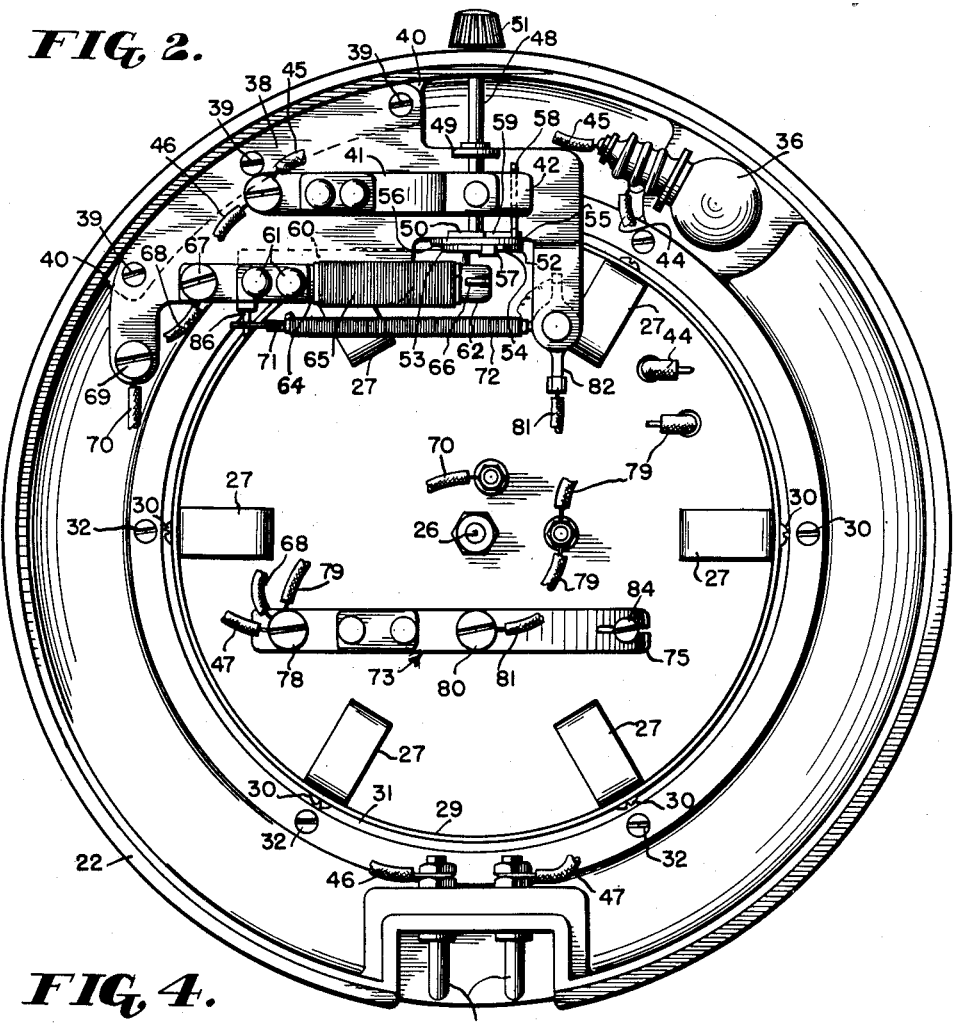
Fig. 2 is a view of the stove in inverted position, with the protective cover plate removed and showing elements of the control arranged therein.

The heating element 33, 34, and signal lamp 36 are supplied with current through a pair of terminal pins 37 mounted in a recess in base 22, and adapted to be engaged by the usual plug of an electrical appliance cord (see Figs. 1 and 2).

Energization of heating elements 33, 34 and signal lamp 36 is controlled by mechanism arranged within the confines of base 22. Various types of control mechanisms for automatically cutting off or reducing the heat applied to the water heating bowl of vacuum-type coffee makers after the water has been transferred to the infusion bowl so that the brew is automatically caused to return to the water heating receptacle or bowl, operative in response to the vibrations of the coffee vessel, a functional characteristic of vacuum-type coffee makers, have been described and claimed by me in my aforementioned patents and pending application. The control mechanism now to be described embodies certain new and useful improvements over those just mentioned, and has been found, as a result of experimentation over a considerable period of time, to effectively dampen out all extraneous vibrations caused, for example, by casual and unintended shaking of the table upon which the coffee maker is positioned, or heavy and/or constant foot traffic in the area or vicinity of the coffee maker, and hence to respond only to a continuous series of regular vibrations of the coffee vessel, a desideratum closely approached but not fully attained by my aforementioned previous control mechanisms.

The various elements or components of my improved control mechanism, their structural details, the electrical connections between the several components, and the over-all operation of the control mechanism will now be specifically described, with particular reference to Figs. 2 to 13 inclusive, thus:

A plate 38 of metal or other suitable conductive material is secured within the confines of base 22 as by being bolted, as at 39 to an internal ledge 40 formed integrally with the base. Mounted on the plate 38 is a switch embodying a pair of spring contacts 41, 42, contact 42 being in direct engagement with plate 38, and contact 41 being insulated from contact 42. As best shown in Fig. 12 switch contact 41 is connected in circuit with lamp 36, auxiliary or warming heater element 34 and one of the terminal pins 37 by wires 46, 45 and 44; the other end of heater element 34 being electrically connected with the other of terminal pins 37 by wires 79 and 47. It will thus be seen that when an electric cord is connected to pins 37 a circuit will be completed through indicating lamp 36 and the auxiliary heater element 34. A limited amount of heat is then applied to the coffee making vessel.

For controlling movement of the switch contacts 41, 42 into and out of engagement with one another, there is provided a switch actuator comprising a shaft 48 journaled in bearing brackets 49, 50 formed integral with plate 38. One end of shaft 48 extends outwardly through base 22, and at said end is equipped with a hand knob 51 (see Fig. 2). On the inner end of shaft 48 there is fixedly secured thereto a cam disc 52 having a straight peripheral edge portion 53, and also provided with a peripheral notch 54. Loose on shaft 48 and disposed between cam disc 52 and bearing bracket 50 is a detent disc 55, the periphery of which is notched to provide an abutment shoulder 56 for a purpose which will be presently disclosed. Disc 55 is provided with a lateral lug 57 that has working engagement with disc 52 at the notch 54 thereof for transmitting rotative movement of shaft 48 to disc 55. Disc 55 is also provided with a lateral arm 58 which cooperates with an arcuate notch 59 provided on the periphery of bracket 50 to limit rotative movement of shaft 48. Arm 58 parallels shaft 48 and is constantly impinged by switch contact 42. Normally shaft 48 and associated discs 52 and 55 are in the position shown in Figs. 8 and 10, and switch contacts 41, 42 are separated or out of contact with one another. When it is desired to engage contacts 41, 42 to complete a circuit through the main heater element 33 (and which circuit will be hereinafter traced in detail), shaft 48 is rotated from the position shown in Fig. 10 to that shown in Fig. 11. As shaft 48 is so rotated disc 52 moves in a counterclockwise direction (Fig. 6) to engage lug 57 and continued movement of that disc in the mentioned direction will cause disc 55 to rotate in the same direction so that arm 58 will flex contact 42 into engagement with contact 41.

It will be noted that the spring contact 42 impinging arm 58 tends to urge shaft 48 to rotate to an open circuit position. Acting in cooperation with the aforementioned abutment shoulder 56 of detent disc 55 and in opposition to switch contact 42 is a spring dog 60 that is at one end enchored to plate 38 as at 61, and has a free end arranged in the path of shoulder 56 (see Figs. 6 and 7). With shaft 48 in a closed circuit position, the free end of spring dog 60 is engaged with abutment shoulder 56 for releasably retaining switch contact 41, 42, engaged.

For automatically flexing spring dog 60 out of engagement with shoulder 56 and thus permit shaft 48 to rotate in response to the action thereon of switch contact 42 (resulting in contact 42 moving out of engagement with switch contact 41) to an open circuit position, there is provided a thermal-responsive trip assembly embodying a bimetallic strip 62 secured adjacent one end thereof to plate 38 by the same anchoring means 61 employed for spring dog 60, and suitably insulated from plate 38 as indicated generally at 63. An insulator 64, of material, for example, such as asbestos, surrounds a portion of bimetallic strip 62 and has wound thereon a high resistance wire or heating element 65. At one end thereof bimetallic strip 62 is provided with a dielectric lug 66 movable therewith into and out of engagement with spring dog 60. At the other end thereof strip 62 is provided with a terminal screw 67 for electrically connecting therewith a wire 68 through the medium of which, and aforementioned wire 47, strip 62 is electrically connected with a pin 37 and heaters 33, 34 (see Fig. 12). With switch contacts 41, 42 engaged for closing the circuit through the main heating element 33 and with spring dog 60 engaged with shoulder 56 (Figs. 7 and 11), the resistance wire 65 will, in a manner hereinafter more fully explained, be caused to reach a temperature sufficient to cause strip 62 to flex and engage lug 66 thereon with dog 60 to cause the latter to flex out of engagement with shoulder 56 whereupon shaft 48 will rotate in response to the action of spring switch contact 42 resulting in a separation of contacts 41, 42 and hence the interruption of the circuit through heater 33, as will presently appear.

As before stated, switch contact 42 is in direct contact with metallic plate 38. Plate 38 is provided with a binding screw or post 69 for electrically connecting therewith wire 70 that leads to one side of heater element 33 (see Fig. 12).

Another very salient feature of this invention is what may be termed an intermediate or thermal-responsive triggering and extraneous vibrations dampening device. This device comprises a very narrow bimetallic strip 71 that at one end is in direct positive electrical engagement with plate 38. Wound on strip 71 is a resistance wire or heating element 72. One end of the resistance wire or heating element 72 is in direct positive electrical engagement with strip 71, while the opposite end is electrically connected, in a manner to be explained, with one side of a vibratory normally open inertia switch 73 (see Fig. 12) to be subsequently described. For the major length thereof resistance wire 72 is insulated from its associated bimetallic strip 71 through the medium of suitable insulation material as also clearly shown in Fig. 12.

Figure 4:
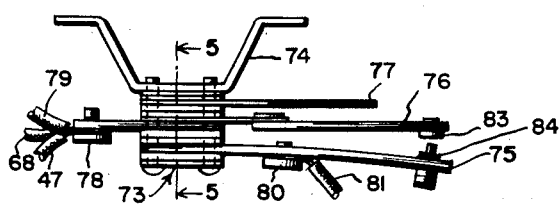
Fig. 4 is a side elevational view of a vibratory or normally open inertia switch assembly forming part of the invention.
Figure 5:
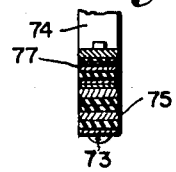
Fig. 5 is a detail sectional view taken substantially on the line 5—5 of Fig. 4.
Figure 3:
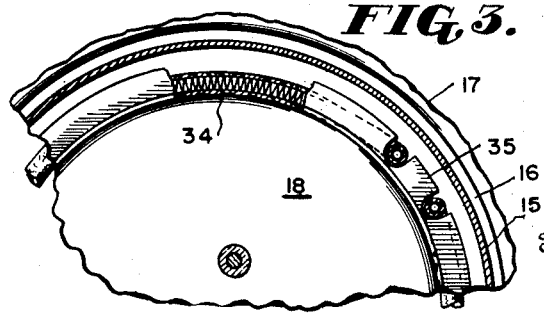
Fig. 3 is a fragmentary detail horizontal sectional view taken substantially on the line 3—3 of Fig. 1.
Figure 6:
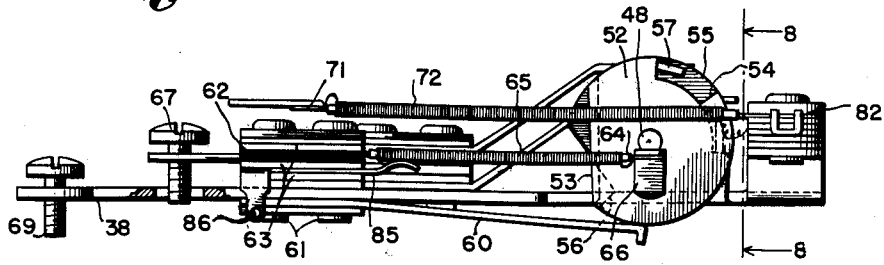
Fig. 6 is an elevational view of the improved switch and resistor assembly forming salient features of this invention, and showing the parts thereof when the switch is in open circuit position.

Referring to Figs. 2, 4 and 5, at the underside of heat baffle 24 and extending into base 22 is a bracket 74 secured in position in any suitable manner, as by being bolted to baffle 24. This bracket provides a support for the elements or components of inertia switch 73, namely, a rigid contact member 75, a vibratory contact element 76 and an arrester or stop member 77, all of which elements are suitably electrically insulated from the bracket and on each other as clearly shown in Figs. 4 and 5.

Vibratory element 76 of inertia switch 73 is provided with a terminal screw 78 for electrically connecting therewith wire 79 and aforementioned wires 68 and 47 through the medium of which the element 76 is electrically connected with bimetallic strip 62 and associated heating element 65 and with one of the pins 37 and also the heater elements 33, 34 (see Fig. 12).

Contact member 75 of inertia switch 73 is provided with a terminal screw or clip 80 (Fig. 4) for electrically connecting therewith a wire 81 that is also electrically connected, through the medium of a terminal connector or clip 82 suitably mounted on plate 38 (Fig. 2), with the resistance wire or heating element 72 of the aforementioned triggering and vibration dampening device (see Fig. 12).

Vibratory contact element 76 is provided with a contact 83, and cooperable therewith is a contact 84 threadedly engaged with contact member 75 for adjustment laterally thereof, thus providing an inertia switch 73 having a wide range of adjustment. Arrestor 77 serves to prevent excessive arcuate movement of vibratory element 76.

When switch contacts 41, 42 are moved into engagement with one another by rotation of the shaft 48, and are secured in such engagement by reason of abutment shoulder 56 being engaged by spring dog 60, all in a manner hereinabove described in detail, electricity will flow from pins 37 through wire 46, closed contacts 41, 42, metallic plate 38, wire 70, the main heating element 33, wires 79 and 47, back to source. A large amount of heat is now being applied to the water heating vessel 12. When the water in the lower vessel is sufficiently heated, a large portion of this water will rise to the upper vessel. As steam passes from the lower vessel through the water in the upper vessel, vibratory motion of the vessels result. These vibrations are communicated, by way of the baffle 24 and bracket 74, to the vibratory contact element 76 causing intermittent closing of contacts 83 and 84. As contacts 83 and 84 intermittently engage, pulses of current are caused to flow through the mechanism as follows: From pins 37, through wire 46, closed contacts 41 and 42, metallic plate 38, bimetallic strip 71, resistance wire 72, clip 82, wire 81, member 75, vibratory element 76, wire 47 and back to source. The frequency and duration of these pulses determine the extent the resistor 72 and thusly the bimetallic strip 71 is allowed to heat. When properly heated, the strip 71 flexes the required distance to effect further operation of the control mechanism resulting in a shutting off of the main heating element 33 in a manner becoming more clearly apparent as the description proceeds.

Electrically connected to one end of the resistor 65 is a conductor plate 85 equipped with a lateral portion 86 so disposed as to extend from the plate and into the path of movement of the strip 71; the conductor plate 85 and its lateral portion 86 forming one element, and the strip 71 forming a second element of what may be termed a normally open circuit maker and breaker. As the strip 71 becomes sufficiently heated to flex into electrical engagement with the lateral portion 86, the following circuit is completed: from pin 37 through wire 46, closed contacts 41 and 42, metallic plate 38, bimetallic strip 71, lateral portion 86, plate 85, resistor 65, bimetallic strip 62, wires 68 and 47 back to source. The completion of this circuit results in a rapid heating of the resistor 65 and thusly the strip 62 whereby the latter rapidly flexes to press the lug 66 into engagement with the spring dog 60, causing the dog to move out of engagement with abutment shoulder 56. When dog 60 moves out of engagement with shoulder 56, switch contact 42, impinging on arm 58, will cause detent disc 55 to rotate, and by reason of the lug 57 and notch 54 connection between disc 55 and cam disc 52 the latter, together with shaft 48, will be caused to rotate from the position shown in Figs. 7 and 11 to the position shown in Figs. 6, 9 and 10. As a consequence contacts 41, 42 are separated and disc 52 is in peripheral engagement with the dog 60 for retaining the latter in this flexed condition. With contacts 41, 42 thus disengaged, the current going to the main heater 33 is cut off and the brewed coffee is allowed to return to the lower vessel 10. It will also be noted in this connection that the parts are now in position to complete the cycle of operation just described for the next coffee brewing cycle.

Should it be desired at any time to effect manual shut-off of the main heating element 33 by separating the contacts 41 and 42, the hand knob 51 may be rotated counter to the direction required for closing the contacts, thusly to bring the flat edge 53 of the disc 52 into engagement with the dog 60 to cam the dog out of locking engagement with the disc 55. The disc 55 when so freed is thereupon rotated by the spring action of contact 42 to contact separated position, as previously described.

In order to more fully appreciate the improvement in coffee makers of this type as provided by the present arrangement, reference is again made to the aforementioned patents and patent application, certain of which disclose that the part thereof corresponding to the resistor 65 herein is connected directly in series with the therein disclosed vibratory contacts corresponding to contacts 83 and 84 of this disclosure. By such an arrangement, as contacts 83 and 84 intermittently close as from vibratory motion of the vessel supporting surface, electrical impulses are directed through the resistor 65 causing it to heat and accordingly to heat the thermal responsive strip corresponding to the strip 62 as shown in the instant device. The heating of this strip causes it to deflect toward control operating position.

It was found that a strip of the size and mass of strip 62 cooled at a relatively slow rate; consequently accidental closing of the vibratory contacts, as from jars or heavy walking within the vicinity of the coffee maker, not unfrequently resulted in a gradual accumulation of heat within this strip 62, sufficient to cause its deflection prematurely to operating position with the control. Reducing the size of the strip 62, for more rapid cooling, failed to remedy this difficulty for the reason that the strip then lacks the necessary strength to perform the control releasing operation. Further, it was found that a strip of reduced mass and constructed long thin and narrow, such as the strip 71, cooled at a much more rapid rate, while lacking the necessary strength to operate the control, such a strip could, and as herein specified, be utilized to electrically connect an electroresponsive triggering mechanism as provided by the resistor wound strip 62. The cooling of the strip 71 occurs at such a rapid rate, it requires almost continuous vibratory closing of contacts 83 and 84 to cause a sufficient accumulation of heat within the strip 71 as to effect its deflection to any appreciable degree. When properly heated the strip 71 deflects the predetermined distance necessary to electrically connect and thusly activate the control triggering device as represented by the resistor 65 and strip 62. By such an arrangement is provided a new and improved structure relatively insensitive to intermittently applied vibration while highly responsive to prolonged and continuous vibration as occurs during the final coffee brewing operation.

It is to be noted that the auxiliary or warming heating element 34 (Fig. 12) remains operative so long as pins 37 are connected to the source of electricity, and whether contacts 41, 42 are engaged or disengaged. The function of heating element 34 is to supply a small amount of heat to keep the finished coffee warm and ready for use. Indicating light 36 signals when the auxiliary or warming heating element is operative, thereby indicating to the user that if it is no longer desired to maintain the finished coffee warm, pins 37 should be disconnected from the source of electricity.

If desired, however, there may be inserted in series circuit with the heating element 34 any suitable thermal-responsive switch, as shown in Fig. 13 and indicated generally therein by the reference numeral 87. When such a switch is employed, it will be apparent that in time the heat generated by the heating element 33 during the brewing operation, will cause the normally closed thermal switch 87 to open, thus interrupting the circuit through the heating element 34 and light 36. At the completion of the brewing operation and as the stove sufficiently cools, the thermal switch 87 will again close to electrically connect the warming element, whereby the brewed coffee is maintained at the desired heated temperature until consumed or until the stove is disconnected by removing the connector plug from the terminal pins.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. In a coffee maker of the vacuum type having an electric heater, a control for said heater comprising a switch connected in circuit therewith and adapted to be manually moved to an "on" position and automatically moved to an "off" position, and means for controlling the automatic movement of the switch comprising a bimetallic strip operatively engageable with the switch and movable when heated to cause movement of the switch to an "off" position, a heating resistor mounted in close proximity to said bimetallic strip, a normally open circuit maker and breaker for controlling the flow of current through said heating resistor, a second bimetallic strip, a heating resistor mounted in close proximity to the second bimetallic strip, said second bimetallic strip being arranged to effect when heated a closing of said normally open circuit maker and breaker, and a vibrative circuit closer in circuit with the second resistor for controlling the flow of current through the second resistor to heat the second bimetallic strip and thereby effect the aforementioned closing of the normally open circuit maker and breaker thereby effecting heating of the first-mentioned bimetallic strip and consequent movement of the switch to the "off" position.

2. A stove for vacuum type coffee makers comprising a resiliently mounted vessel supporting surface having an electric heating element associated therewith, a switch arranged in circuit with said heating element and having an "on" position and an "off" position, means operatively associated with the switch for releasably retaining the latter in an "on" position, a bimetallic strip mounted in operative position to said means and movable when heated to effect operation of said means for releasing the switch and effect movement of the latter to an "off" position, a heating resistor mounted in close proximity to said bimetallic strip for heating the latter, a normally open circuit maker and breaker arranged in circuit with said heating resistor, a second bimetallic strip disposed in operative position to said circuit maker and breaker for effecting movement of the latter to a circuit closing position when heated, a second heating resistor mounted in close proximity to the second bimetallic strip for heating the latter, and a vibrative circuit closer responsive to vibrations of said resiliently mounted vessel supporting surface connected in circuit with the second heating resistor to produce pulses of current therethrough for heating the second bimetallic strip and effect closing of said normally open circuit maker and breaker for the purpose specified.

3. In a coffee maker of the vacuum type, a stove embodying a resiliently mounted vessel supporting surface, an electric heating element arranged in proximity to said surface, an energizing circuit for said heating element, and control means for the energizing circuit operative to effect respectively a manual closing of the circuit and an automatic opening of the circuit in response to vibratory action of the resiliently mounted vessel supporting surface comprising, a switch adapted to be manually moved to an "on" position and automatically moved to an "off" position together with means for controlling the automatic movement of the switch including a pair of resistors one of which when heated serves to effect a release of the switch for movement to the "off" position, a circuit maker and breaker electrically connected with the said one resistor and operative to effect a closed circuit therethrough when the other of said resistors is heated, a vibrative circuit closer electrically connected with said other resistor to produce pulses of current therethrough to heat the latter in response to vibratory action of said resiliently mounted vessel supporting surface, an auxiliary electric heating element arranged in proximity to said vessel supporting surface, and a switch arranged in circuit with the auxiliary electric heating element including a thermal-responsive element responsive to the heating and cooling of the first-mentioned electric heating element for opening and closing the circuit for the auxiliary heating element.

4. In a stove for a coffee maker of the vacuum type having a resiliently mounted vessel-supporting surface, an electric heater associated therewith and an energizing circuit for the heater, control means for the energizing circuit operative to effect a manual closing of the circuit and an automatic opening of said circuit in response to vibratory action of the resiliently mounted vessel supporting surface comprising a switch adapted to be manually moved to an "on" position and automatically moved to an "off" position, and means for controlling the automatic movement of the switch including a thermal-responsive device operable when heated to cause movement of the switch to an "off" position, a circuit maker and breaker for controlling the heating of said thermal-responsive device, a second thermal-responsive device for controlling the operation of said circuit making and breaking device, and a vibrative circuit closer connected with the second thermal-responsive device for controlling the heating thereof in response to the vibrations of the vessel supporting surface.

5. In a coffee maker of the vacuum type embodying a resiliently mounted vessel supporting surface, a heater and a control switch for said heater respectively, means for effecting a movement of the control switch automatically to an "off" position in response to vibratory action of the resiliently mounted vessel supporting surface including a thermal-responsive device operable when heated to cause movement of said switch to an "off" position, a circuit maker and breaker for controlling the heating of said thermal-responsive device, a second thermal-responsive device for controlling the operation of said circuit making and breaking device and a vibrative circuit closer operable in response to the vibrations of the vessel supporting surface and connected with the second thermal-responsive device for controlling the heating thereof.

References Cited in the file of this patent

UNITED STATES PATENTS

| | | |
|---|---|---|
| 1,700,661 | Appelberg | Jan. 29, 1929 |
| 1,981,251 | Roth | Nov. 20, 1934 |
| 2,009,601 | Anderson | July 30, 1935 |
| 2,385,694 | Davis, Jr. | Sept. 25, 1945 |
| 2,402,163 | Huenergardt | June 18, 1946 |
| 2,492,865 | Huenergardt | Dec. 27, 1949 |
| 2,567,187 | Davis, Jr. | Sept. 11, 1951 |
| 2,567,188 | Davis, Jr. | Sept. 11, 1951 |
| 2,625,642 | Davis, Jr. | Jan. 13, 1953 |